United States Patent
Cichocki et al.

(10) Patent No.: US 8,285,773 B2
(45) Date of Patent: Oct. 9, 2012

(54) SIGNAL SEPARATING DEVICE, SIGNAL SEPARATING METHOD, INFORMATION RECORDING MEDIUM, AND PROGRAM

(75) Inventors: Andrzej Cichocki, Wako (JP); Rafal Zdunek, Wako (JP); Shunichi Amari, Wako (JP); Gen Hori, Wako (JP); Ken Umeno, Wako (JP)

(73) Assignee: Riken, Saitama (JP)

( * ) Notice: Subject to any disclaimer, the term of this patent is extended or adjusted under 35 U.S.C. 154(b) by 917 days.

(21) Appl. No.: 12/226,651

(22) PCT Filed: Apr. 27, 2007

(86) PCT No.: PCT/JP2007/059172
§ 371 (c)(1),
(2), (4) Date: Oct. 24, 2008

(87) PCT Pub. No.: WO2007/126054
PCT Pub. Date: Nov. 8, 2007

(65) Prior Publication Data
US 2009/0234901 A1    Sep. 17, 2009

(30) Foreign Application Priority Data

Apr. 27, 2006  (JP) ................................. 2006-124167

(51) Int. Cl.
*G06F 17/10* (2006.01)
(52) U.S. Cl. ......... 708/320; 708/200; 708/300; 708/514
(58) Field of Classification Search .................. None
See application file for complete search history.

(56) References Cited

U.S. PATENT DOCUMENTS

| | | | |
|---|---|---|---|
| 6,295,546 B1 * | 9/2001 | Adiletta | 708/402 |
| 6,535,666 B1 * | 3/2003 | Dogan et al. | 385/31 |
| 7,158,559 B2 * | 1/2007 | Olson et al. | 375/148 |

(Continued)

FOREIGN PATENT DOCUMENTS

JP      2003141102      5/2003

(Continued)

OTHER PUBLICATIONS

International Search Report from EP 07 74 2607 dated May 10, 2011.

(Continued)

*Primary Examiner* — Chuong D Ngo
*Assistant Examiner* — Michael D Yaary
(74) *Attorney, Agent, or Firm* — Ohlandt, Greeley, Ruggiero & Perle, LLP

(57) ABSTRACT

A signal separating device includes an iterative estimator, a repeating calculator, a result output unit, and a repetition controller. The repeating calculator repeatedly causes the iterative estimator to iteratively perform independent component analysis on an observed signal matrix, and to further perform independent component analysis on the source signal matrix obtained as a result. The result output unit outputs the product of the respective mixing matrices obtained during each repetition as a mixing matrix with respect to the observed signal matrix, while also outputting the source signal matrix obtained during the final repetition as a source signal matrix with respect to the observed signal matrix. The repetition controller causes the repeating calculator to repeat the calculation control until all mixing matrices and all source signal matrices satisfy a convergence condition. The iterative estimator may perform a fixed number of iterations, or perform iterations until convergence is obtained.

12 Claims, 8 Drawing Sheets

U.S. PATENT DOCUMENTS

| | | | | |
|---|---|---|---|---|
| 7,860,134 B2* | 12/2010 | Spence et al. | | 370/536 |
| 2005/0013352 A1* | 1/2005 | Hottinen | | 375/219 |
| 2005/0149596 A1* | 7/2005 | Jeon et al. | | 708/607 |
| 2005/0203981 A1* | 9/2005 | Sawada et al. | | 708/322 |

FOREIGN PATENT DOCUMENTS

| | | |
|---|---|---|
| JP | 2003271166 | 9/2003 |

OTHER PUBLICATIONS

Stadlthanner, et al., "*Hybriding Sparse Component Analysis with Genetic Algorithms for Blind Source Separation*", Biological and Medical Data Analysis Lecture Notes in Computer Science; Lecture Notes in Bioinformatics; LNCS, Springer, Berlin, DE, vol. 3745, Jan. 1, 2005, pp. 137-148.

Jong-Hoon, et al., "*Multiple Nonnegative-Matrix Factorization of Dynamic Pet Images*", Proceedings of the 6th Asian Conference on Computer Vision, Jan. 2004, pp. 1009-1013.

Lee, et al., "*Learning the Parts of Objects by Non-negative Matrix Factorization*", Nature, Nature Publishing Group, vol. 401, No. 6755, Oct. 21, 1999, pp. 788-791.

Cichocki, et al, "*Extended SMART Algorithms for Non-negative Matrix Factorization*", Artificial Intelligence and Soft Computing—ICAISC 2006, vol. 4029, Jul. 25, 2006, pp. 548-562.

Cichocki, et al, "*Nonnegative Matrix and Tensor Factorizations—Applications to Exploratory Multi-way Data Analysis and Blind Source Separation*"; 2009, John Wiley & Sons, p. 14.

Cichocki, et al., "*Chapter 13—Non-negative Mixtures*"; In: Comon P, Jutten C: "Handbook of Blind Source Separation—Independent Component Analysis and Applications", 2010, Academic Press, Oxford, pp. 515, 529-530.

Cichoci, et al., "*Adaptive Blind Signal and Image Processing—Learning Algorithms and Applications*", 2002, John Wiley & Sons, pp. 5, 6, 15-16, 44.

Haykin S., "*Unsupervised Adaptive Filtering—Volume 1, Blind Source Separation*", 2000, John Wiley & Sons, pp. 258-259.

International Search Report from PCT/JP2007/059172 dated Jul. 24, 2007.

* cited by examiner mean(SIR) = 46.0 [dB]

INDEX OF ESTIMATED SIGNALS

SIGNAL SEPARATING DEVICE, SIGNAL SEPARATING METHOD, INFORMATION RECORDING MEDIUM, AND PROGRAM

TECHNICAL FIELD

The present invention relates to a signal separating device, a signal separating method, a computer-readable information recording medium storing a program that realize the above on a computer or digital signal processor, and the program, which are suitable for improving precision as much as possible and speeding up convergence as much as possible in signal separating technology such as independent component analysis.

BACKGROUND ART

Conventionally, techniques have been proposed involving component analysis such as principal component analysis (including component analysis by sphereing), independent component analysis, and non-negative matrix factorization (NMF), wherein, given data strings, the data strings are separated into a plurality of components (such as principal components, independent components, or factors). For example, such technology is disclosed in a literature such as the following.

Patent Literature 1: Unexamined Japanese Patent Application KOKAI Publication No. 2003-141102

Patent Literature 1 proposes a technology in which principal component analysis or independent component analysis is used to separate a change in the quantity of a chemical substance into a plurality of components, and then uses these components to classify the factors of generation for the chemical substance into groups.

In general, independent component analysis involves the following:

(1) Upon receiving observed signals from m number of channels, the signals are conceived as an observed signal matrix X having m rows and T columns, wherein the time-axis observed values are arranged in rows in the column direction, and the rows are arranged in channel order.

The observed signal matrix X is then separated into:

(2) a source signal matrix S having n rows and T columns, wherein the time-axis source signal values of the source signal from n number of channels are arranged in rows in the column direction, and the n number of rows are arranged in channel order;

(3) a mixing matrix A having m rows and n columns and showing the path from the respective channels of the source signal to the respective channels of the observed signal; and (4) a noise matrix N having m rows and T columns.

At this point, separation is performed such that for a predefined matrix operation $c(\bullet, \bullet)$, the condition (5) $X = c(A, S) + N$ is satisfied. Matrix multiplication, matrix convolutions, and various non-linear matrix link functions may be used as the matrix operation $c(\bullet, \bullet)$.

In addition, while at this point it is typical to use iterative methods such as the gradient method, the conjugate gradient method, or Newton's method, the following is adopted as a cost function:

(6) a matrix function $J(\bullet, \bullet, \bullet)$ that takes a matrix of m rows and T columns, a matrix of m rows and n columns, and a matrix of n rows and T columns, and returns a scalar value.

More specifically, for $J(X, A, S)$ wherein X is fixed and A and S are varied, a combination of A and S is calculated such that the value of $J(X, A, S)$ is minimized (i.e., a minimum. Typically, the function solves for a maximum or a minimum, or in other words, an "extremum".)

Examples of functions that can be used as this cost function include: a function $J(X, A, S)$ that returns the absolute value of the element with the largest absolute value in the matrix (X−AS) (i.e., the maximum absolute value of the elements); a function that returns the average of the squares of each element in the matrix (X−AS); and a function that returns the total sum of the squares of each element in the matrix (X−AS). In addition, other constraints, such as non-negativity, sparseness, and statistical independence may be applied as necessary.

DISCLOSURE OF INVENTION

Problem to be Solved by the Invention

However, if merely iterative methods are simply applied, there is a problem in that convergence takes a significant amount of time and signal separability decreases in the case where there are large differences in signal strengths among the source signals, or in the case where the differences among the observed signals are slight (i.e., the case wherein the observed signals are similar).

Consequently, there is strong demand for a signal separating technology that rapidly reaches convergence and also improves signal separability, even in cases such as the above.

The present invention is made to solve the foregoing problems, and its object is to provide a signal separating device, a signal separating method, and a computer-readable information recording medium storing a program that realizes the above on a computer or digital signal processor, and the program, which are suitable for improving precision as much as possible and speeding up convergence as much as possible in signal separating technology such as independent component analysis.

Means for Solving the Problem

A signal separating device according to a first aspect of the present invention is provided with an iterative estimator, a repeating calculator, and a result output unit, wherein the signal separating device separates an observed signal matrix X having m row and T columns into matrices A and S such that $$X = c(A, S) + N$$

is satisfied for a predefined matrix operation $c(\bullet, \bullet)$, wherein A is a mixing matrix having m rows and n columns, S is a source signal matrix having n rows and T columns, and N is a noise matrix having m rows and T columns. The signal separating device is configured as follows.

The iterative estimator operates with respect to a matrix function $J(\bullet, \bullet, \bullet)$ that takes a matrix having m rows and T columns, a matrix having m rows and n columns, and a matrix having n rows and T columns, and returns a scalar value. Upon receiving a matrix having m rows and T columns, a matrix having m rows and n columns, and a matrix having n rows and T columns, the iterative estimator iteratively estimates, through a predetermined number of repetitions, a combination of arguments, which are a matrix having m rows and n columns and a matrix having n rows and T columns, whereby the scalar value returned by the matrix function $J(\bullet, \bullet, \bullet)$ is extremized when the matrix having m rows and T columns is fixed.

Meanwhile, the repeating calculator calculates, by repetition, L number of matrices $A_1, A_2, A_3, \ldots, A_L$ such that $$c(A_1, c(A_2, c(A_3, c(\ldots, c(A_{L-1}, A_L)\ldots))))$$

yields a matrix of m rows and n columns. In this, the repeating calculator defines a matrix $$S_0 = X$$

wherein, during the i-th repetition (i=1, 2, 3, ..., L), the repeating calculator supplies to the iterative estimator a matrix $S_{i-1}$ having m rows and T columns, a predefined initial value matrix having m rows and n columns and a predefined initial value matrix having n rows and T columns for a matrix function $J_i(\bullet, \bullet, \bullet)$ of the i-th repetition. The iterative estimator is thereby caused to make iterative estimations with respect to the matrix function $J_i(\bullet, \bullet, \bullet)$ that takes a matrix having m rows and T columns, a matrix having m rows and n columns, and a matrix having n rows and T columns and then returns a scalar value. The repeating calculator then takes the resulting matrix of m rows and n columns to be $A_i$, and also takes the matrix of n rows and T columns to be $S_i$.

In addition, the result output unit calculates a mixing matrix A of m rows and n columns by evaluating $$A = c(A_1, c(A_2, c(A_3, c(\ldots, c(A_{L-1}, A_L)\ldots))))$$

using the L number of matrices $A_1, A_2, A_3, \ldots, A_L$ calculated above. The result output unit then takes the matrix $S_L$ of n rows and T columns calculated above to be the source signal matrix S of n rows and T columns, and then outputs the matrices A and S.

In addition, the signal separating device of the present invention may be further provided with a repetition controller configured as follows.

The repetition controller causes the repeating calculator to re-calculate repetitions until the calculated L number of matrices $A_1, A_2, A_3, \ldots, A_L$ and the matrix $S_L$ of n rows and T columns satisfy a predetermined convergence condition. The repetition controller causes the $A_i$ from the last repetition before the re-calculation and the $S_i$ from the last repetition before the re-calculation to be supplied as the predefined initial value matrix of m rows and n columns and the predefined initial value matrix of n rows and T columns for the i-th repetition.

On the other hand, if the predetermined convergence condition is met, then the result output unit calculates and then outputs the matrices A and S.

In addition, in the signal separating device of the present invention, the result output unit may additionally calculate a noise matrix of m rows and T columns according to $$N = X - c(A, S)$$

and additionally output this matrix N.

In addition, in the signal separating device of the present invention, the predefined matrix operation $c(\bullet, \bullet)$ may be defined as a matrix product operation.

In addition, in the signal separating device of the present invention, the predefined matrix operation $c(\bullet, \bullet)$ may be defined as a convolution operation.

In addition, in the signal separating device of the present invention, the predefined matrix operation $c(\bullet, \bullet)$ may be defined as a non-linear link function.

In addition, in the signal separating device of the present invention, the number of iterations performed by the iterative estimator may be set to one iteration per repetition for all i (i=1, 2, 3, ..., L).

In addition, in the signal separating device of the present invention, the i-th (i=1, 2, 3, ..., L) matrix function $J_i(\bullet, \bullet, \bullet)$ used with respect to the iterative estimator may be defined to be an identical matrix function for all i.

A signal separating method according to another aspect of the present invention is executed by a signal separating device that includes an iterative estimator, a repeating calculator, and a result output unit, wherein the signal separating device separates an observed signal matrix X of m rows and T columns into matrices A, S and N such that $$X = c(A, S) + N$$

is satisfied for a predefined matrix operation $c(\bullet, \bullet)$, wherein A is a mixing matrix of m rows and n columns, S is a source signal matrix of n rows and T columns, and N is a noise matrix of m rows and T columns. The signal separating method comprises an iterative estimation step, a repeating calculation step, and a result output step, and is configured as follows.

In the iterative estimation step, the iterative estimator operates with respect to a matrix function $J(\bullet, \bullet, \bullet)$ that takes a matrix having m rows and T columns, a matrix having m rows and n columns, and a matrix having n rows and T columns, and returns a scalar value. Upon receiving a matrix having m rows and T columns, a matrix having m rows and n columns, and a matrix having n rows and T columns, the iterative estimator iteratively estimates, through a predetermined number of repetitions, a combination of arguments, which are a matrix having m rows and n columns and a matrix having n rows and T columns, whereby the scalar value returned by the matrix function $J(\bullet, \bullet, \bullet)$ is extremized when the matrix having m rows and T columns is fixed.

Meanwhile, in the repeating calculation step, the repeating calculator calculates, by repetition, L number of matrices $A_1, A_2, A_3, \ldots, A_L$ such that $$c(A_1, c(A_2, c(A_3, c(\ldots, c(A_{L-1}, A_L)\ldots))))$$

yields a matrix of m rows and n columns. In order to do this, the repeating calculator defines a matrix $$S_0 = X$$

wherein, during the i-th repetition (i=1, 2, 3, ..., L), the repeating calculator supplies to the iterative estimator a matrix $S_{i-1}$ having m rows and T columns, a predefined initial value matrix having m rows and n columns, and a predefined initial value matrix having n rows and T columns for a matrix function $J_i(\bullet, \bullet, \bullet)$ of the i-th repetition. The iterative estimator is thereby caused to make iterative estimations with respect to the matrix function $J_i(\bullet, \bullet, \bullet)$ that takes a matrix having m rows and T columns, a matrix having m rows and n columns, and a matrix having n rows and T columns and then returns a scalar value. The repeating calculator then takes the resulting matrix of m rows and n columns to be $A_i$, and also takes the matrix of n rows and T columns to be $S_i$.

In addition, in the result output step, the result output unit calculates a mixing matrix A of m rows and n columns by evaluating $$A = c(A_1, c(A_2, c(A_3, c(\ldots, c(A_{L-1}, A_L)\ldots))))$$

using the L number of matrices $A_1, A_2, A_3, \ldots, A_L$ calculated above. The result output unit then takes the matrix $S_L$ of n rows and T columns calculated above to be the source signal matrix S of n rows and T columns, and then outputs the matrices A and S.

In addition, in the signal separating method of the present invention, the signal separating device may further include a repetition controller configured as follows, and the signal separating method may further comprise a repetition controlling step and be configured as follows.

In the repetition controlling step, the repetition controller causes the repeating calculator to re-calculate repetitions until the calculated L number of matrices $A_1, A_2, A_3, \ldots, A_L$ and the matrix $S_L$ of n rows and T columns satisfy a predetermined convergence condition. The repetition controller causes the $A_i$ from the last repetition before the re-calculation and the $S_i$ from the last repetition before the re-calculation to be supplied as the predefined initial value matrix of m rows and n columns and the predefined initial value matrix of n rows and T columns for the i-th repetition.

On the other hand, in the result output step, if the predetermined convergence condition is met, then the matrices A and S are calculated and output.

A program according to another aspect of the present invention causes a computer or digital signal processor to function as the respective components of the above signal separating device, or alternatively, causes the above signal separating method to be executed.

In addition, the program of the present invention may be recorded onto a computer-readable information recording medium, such as a compact disc, a flexible disk, a hard disk, a magneto-optical disk, a digital video disc, magnetic tape, or semiconductor memory.

The above program may be distributed or sold via a computer communications network independently of the computer or digital signal processor upon which the program is executed. In addition, the above information recording medium may also be distributed or sold independently of the computer or digital signal processor.

Effect of the Invention

According to the present invention, a signal separating device, a signal separating method, a computer-readable information recording medium storing a program that realizes the above on a computer or digital signal processor, and the program can be provided, which are suitable for improving precision as much as possible and speeding up convergence as much as possible in signal separating technology such as independent component analysis.

EXPLANATION OF REFERENCE NUMERALS

Figure 1:
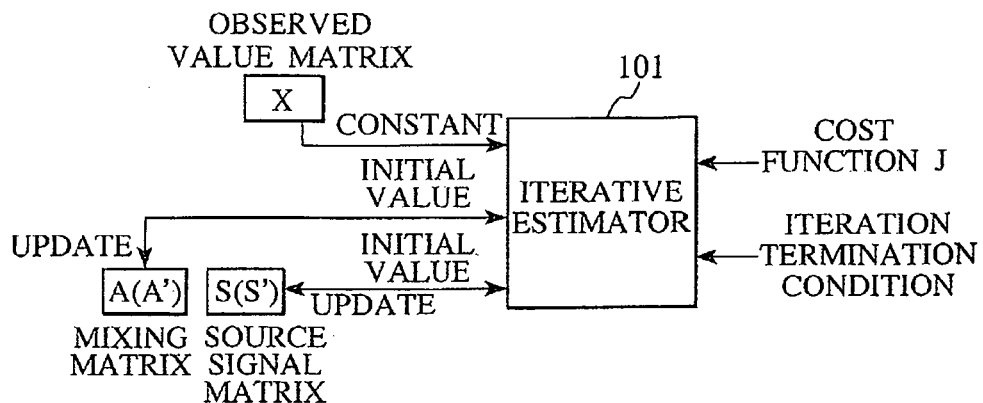
FIG. 1 is a schematic diagram illustrating the general configuration of a transmitting device and a signal separating device according to an embodiment of the present invention.

| | |
|---|---|
| 100 | signal separating device |
| 101 | iterative estimator |
| 102 | repeating calculator |
| 103 | result output unit |
| 104 | repetition controller |
| 105 | storage unit |

BEST MODE FOR CARRYING OUT THE INVENTION

Hereinafter, embodiments of the present invention will be described. The embodiments to be hereinafter described are for the sake of explanation, and are not intended to limit the scope of the present invention. Consequently, while persons skilled in the art may be able to adopt embodiments wherein all or part of these elements have been replaced with their respective equivalents, such embodiments are also to be included within the scope of the present invention.

Furthermore, in the following description, independent component analysis is given as an example of a component analysis technique. However, by using a technique similar to the above, the component analysis technique may be replaced with principal component analysis (including component analysis by sphereing) or non-negative matrix factorization, and such embodiments are also to be included within the scope of the present invention.

In addition, in the following description, the matrix operation $c(\bullet, \bullet)$ is described by way of example as a matrix product in order to ease understanding. However, matrix convolutions and various non-linear matrix link functions may also be used, and cases wherein such functions are adopted are also to be included within the scope of the present invention.

Embodiment 1

First, in order to ease understanding of the computational processes involved in the present embodiment, the various symbols used herein will now be described.

In the present embodiment, the following matrix X is used as the input for signal separation.

(1) Observed signal matrix X, having m rows and T columns

In addition, the following matrices A, S, and N are obtained as the results of the signal separation.

(2) Mixing matrix A, having m rows and n columns
(3) Source signal matrix S, having n rows and T columns
(4) Noise matrix N, having m rows and T columns However, these matrices must exist in the following relationship:

(5) X=AS+N.

Moreover, when X is fixed and A and S are infinitesimally varied, the cost function J(X, A, S) must yield an absolute or a local minimum. (Depending on the type of cost function, the result may be an "extremum", including absolute or local maxima. Hereinafter, the cost function will be taken to solve for a minimum, in order to ease understanding). In other words, the following must hold true:

(6) (A, S)=argmin$_{(A, S)}$J(X, A, S)

In typical independent component analysis techniques, the following may be used as the above cost function: a function that returns the absolute value of the element with the largest absolute value in the matrix (X−AS) (i.e., the maximum absolute value of the elements), a function that returns the average of the squares of each element in the matrix (X−AS), or a function that returns the total sum of the squares of each element in the matrix (X−AS). In addition, other functions, such as Amari's α-divergence, Kullback-Leibler divergence, the Frobenius norm, and Jenssen-Shannon divergence may also be used.

In addition, an iterative method (such as the gradient method, the conjugate gradient method, or Newton's method) is adopted as the computational technique to solve for the above matrices A and S. Ordinarily, this method is iterated until A and S meet a predefined iteration termination condition. For example, the iteration termination condition to be satisfied may be such that the ratio of the total sum of the squares of the differences in the elements of A and S before and after an iteration with respect to the total sum of the squares of the elements in the matrices becomes less than a predetermined value $\epsilon$.

Naturally, in cases where rough analysis is sufficient, the number of iterations may also be fixed to a certain number. This latter case is equivalent to specifying "Number of iterations: xx" as the iteration termination condition.

Computation may also be conducted by applying constraints based on already known properties of the signal to be analyzed. These constraints may include non-negativity, sparseness, space-time decorrelation, smoothness, and independence.

In the present embodiment, a single computational module referred to as the iterative estimator is taken to perform the functions of conducting independent component analysis like the above. A variety of independent component analysis techniques as well as existing techniques can be applied to the processes executed by the iterative estimator.

FIG. 1 is an explanatory diagram illustrating input and output with respect to the iterative estimator. The description hereinafter will refer to this diagram.

An iterative estimator 101 is realized by cooperation between a general computer CPU (Central Processing Unit) and a storage device such as RAM (Random Access Memory).

The matrices X, A, and S are provided to the iterative estimator 101 as input. Typically, the matrices X, A, and S are stored in the RAM or similar memory. The present embodiment is configured such that the addresses of the matrices X, A, and S stored in memory are passed as arguments to the library (program) functions that realize the iterative estimator 101.

Although the matrix X herein is equivalent to an observed signal matrix as described above, in a broader sense the matrix X can be thought of as a constant matrix that defines the conditions involved in the iterative method. On the other hand, although the matrices A and S provided herein are the mixing matrix and the source signal matrix, in a broader sense these can be thought of as the initial values that approximate the true values in the iterative method. Consequently, it is necessary for the matrices A and S stored in the RAM or similar memory to be initialized with some set of values.

In the case where there is no information whatsoever, various techniques are possible (given in the diagram as "Initialize"), such as assigning a random number or a constant (such as 0, 1, or −1) to each element in the matrix A such that the element distribution becomes sparse, and assigning a random number or a constant (such as 0, 1, or −1) to each element in the matrix S. In addition, as described in a later section, the iterative estimator 101 may also take the output result from the previous process as the initial values, this being preferable in many cases.

In addition to the above, the cost function and the termination condition are also provided to the iterative estimator 101. These may be specified directly in the code (program) used to realize the iterative estimator 101, or may be provided by specifying the address of a library function.

The iterative estimator 101 receives the various information described above, iterates until the iteration termination condition is satisfied, and then outputs the matrices A' and S', the values thereof being closer to the true values than the matrices A and S that were provided as input. The matrices A' and S' being output is equivalent to the iteration termination condition being met. Herein, the following are given as examples of the iteration termination condition.

(1) The number of iterations has become 1.
(2) The number of iterations has become a set number n (n≧2).
(3) $(\Sigma_{i=1}^{m}\Sigma_{k=1}^{n}|A'[i,k]-A[i,k]|^2+\Sigma_{k=1}^{n}\Sigma_{t=1}^{T}|S'[i,k]-S[i,k]|^2)\leq\epsilon$
(4) $(\max_{i=1}^{m}\max_{k=1}^{n}|A'[i,k]-A[i,k]|^2+\max_{k=1}^{n}\max_{t=1}^{T}|S'[i,k]-S[i,k]|^2)\leq\epsilon$
(5) $\Sigma_{i=1}^{m}\Sigma_{k=1}^{n}|A'[i,k]-A[i,k]|^2\leq\epsilon$
(6) $\max_{i=1}^{m}\max_{k=1}^{n}|A'[i,k]-A[i,k]|^2\leq\epsilon$
(7) $\Sigma_{k=1}^{n}\Sigma_{t=1}^{T}|S'[i,k]-S[i,k]|^2\leq\epsilon$
(8) $\max_{k=1}^{n}\max_{t=1}^{T}|S'[i,k]-S[i,k]|^2\leq\epsilon$ It is possible that output result and the output method involve overwriting the region in the RAM or similar memory where the matrices A and S that were provided as input are stored, the region being overwritten with the content of A' and S' (given in the diagram as "Overwrite"). The present embodiment primarily adopts such a configuration.

Stated in conjunction with the above points: in the iterative method, X is fixed while A and S are moved in the direction such that J(X, A, S) becomes smaller, thereby yielding the results A' and S', and thus it can be difficult to apply the gradient method or similar method to both matrices A and S.

Consequently, the cost function J(X, A, S) is treated as a combination of two cost functions K(X, A, S) and H(X, A, S). Herein, K(•, •, •) and H(•, •, •) may be selected to be identical cost functions (i.e., the three cost functions K, H, and J are the same), or suitably different cost functions may be selected.

A single iteration of the iterative method is thus typically:

(1) First, X and A are fixed while S is moved in the direction such that K(X, A, S) becomes smaller, the results thereof taken to be S'; and (2) Next, X and S' are fixed while A is moved in the direction such that H(X, A, S') becomes smaller, the results thereof taken to be A'.

Alternatively, a single iteration of the iterative method may also involve the inverse:

(1) First, X and S are fixed while A is moved in the direction such that H(X, A, S) becomes smaller, the results thereof taken to be A'; and (2) Next, X and A' are fixed while S is moved in the direction such that K(X, A', S) becomes smaller, the results thereof taken to be S'.

In the present embodiment, the iterative estimator 101 as described above is used at least L number of times (L≧2) via a subroutine call, but the provided arguments and other parameters in this case may differ. Thus, in order to ease understanding, the description hereinafter will be described as though L number of iterative estimators 101 have been individually prepared.

Figure 2:
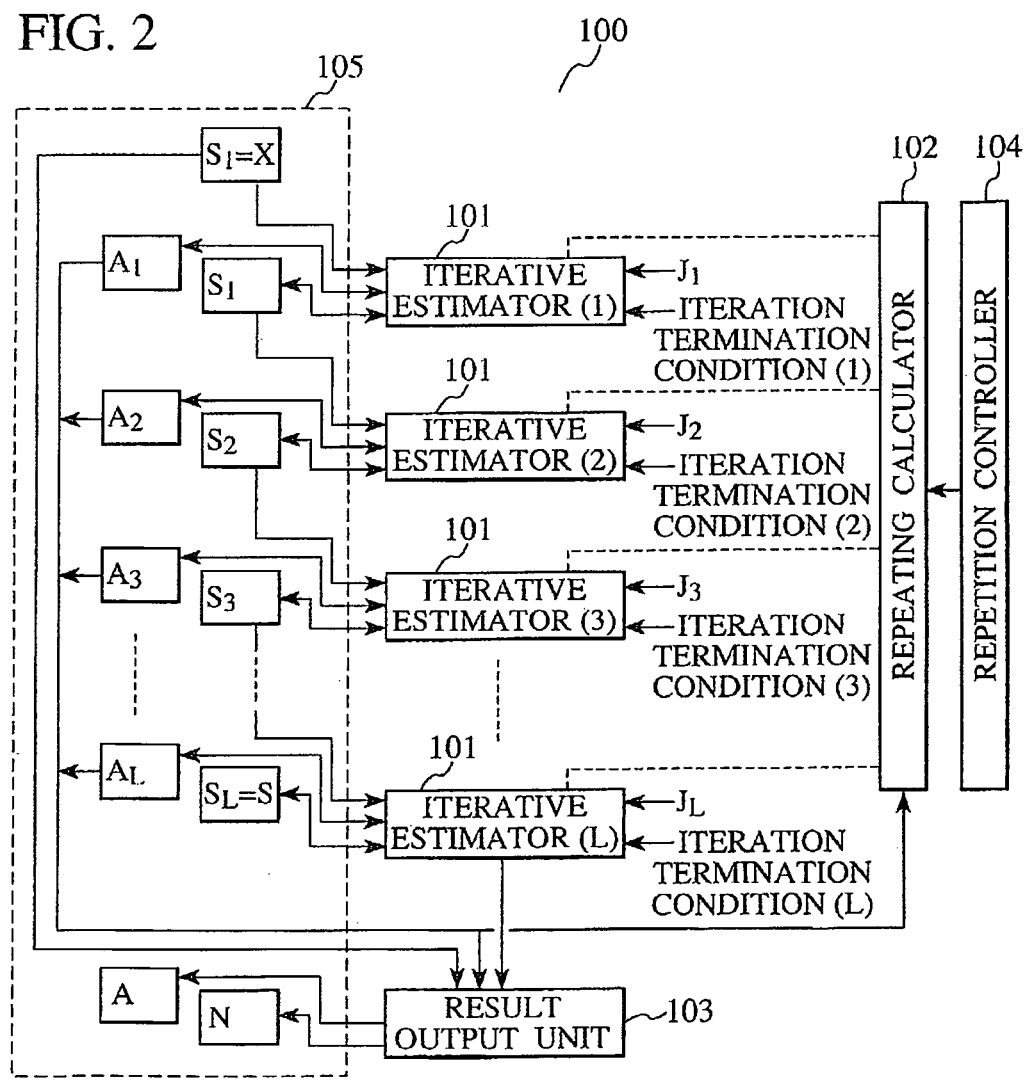
FIG. 2 is a schematic diagram illustrating the configuration of a signal separating device according to the present embodiment.

FIG. 2 is a schematic diagram illustrating the configuration of a signal separating device according to the present embodiment. The description hereinafter will refer to this diagram.

A signal separating device 100 is provided with L number of iterative estimators 101, a repeating calculator 102, a result output unit 103, a repetition controller 104, as well as a storage unit 105.

In the present embodiment, since independent component analysis is performed by a multi-step iterative estimation, L is equivalent to the "step number" or "layer number".

In the storage unit 105, regions for storing the following information are reserved.

(1) An observed signal matrix X, having m rows and T columns. This is the set of observed values that act as the target for signal separation.

(2) L number of matrices $A_1, \ldots, A_L$. These are used for intermediate calculations.

(3) L number of matrices $S_1, \ldots, S_L$, having n rows and T columns. These are used for intermediate calculations.

(4) A mixing matrix A, having m rows and n columns. This is one of the results of signal separation.

(5) A noise matrix N, having m rows and T columns. This is one of the results of signal separation.

It should be preferable that the source signal matrix S, having n rows and T columns and being one of the results of signal separation, can also be identified as $S_L$.

In addition, in order to ease understanding of the expression of recurrence equations, the matrix X will be hypothetically identified as $S_0$.

Furthermore, hereinafter matrix names and the regions within the storage unit 105 where the values of elements in the matrices are stored will be represented using the same symbols, as long as such description does not create confusion.

The L number of matrices $A_1, \ldots, A_L$ are defined such that the predefined operation c(•, •)

$$c(A_1, c(A_2, c(A_3, c(\ldots, c(A_{L-1}, A_L)\ldots))))$$

yields a matrix of m rows and n columns. In the present embodiment, the matrix product is used as c(•, •).

Consequently, in the present embodiment, the constant determining the number of rows and the number of columns of the L number of matrices is determined uniquely as $$n_0 = m, n_1, n_2, \ldots, n_{L-1}, n_L = n$$

and thus $A_i$ is a matrix having $n_{i-1}$ rows and $n_i$ columns.

Figure 3:
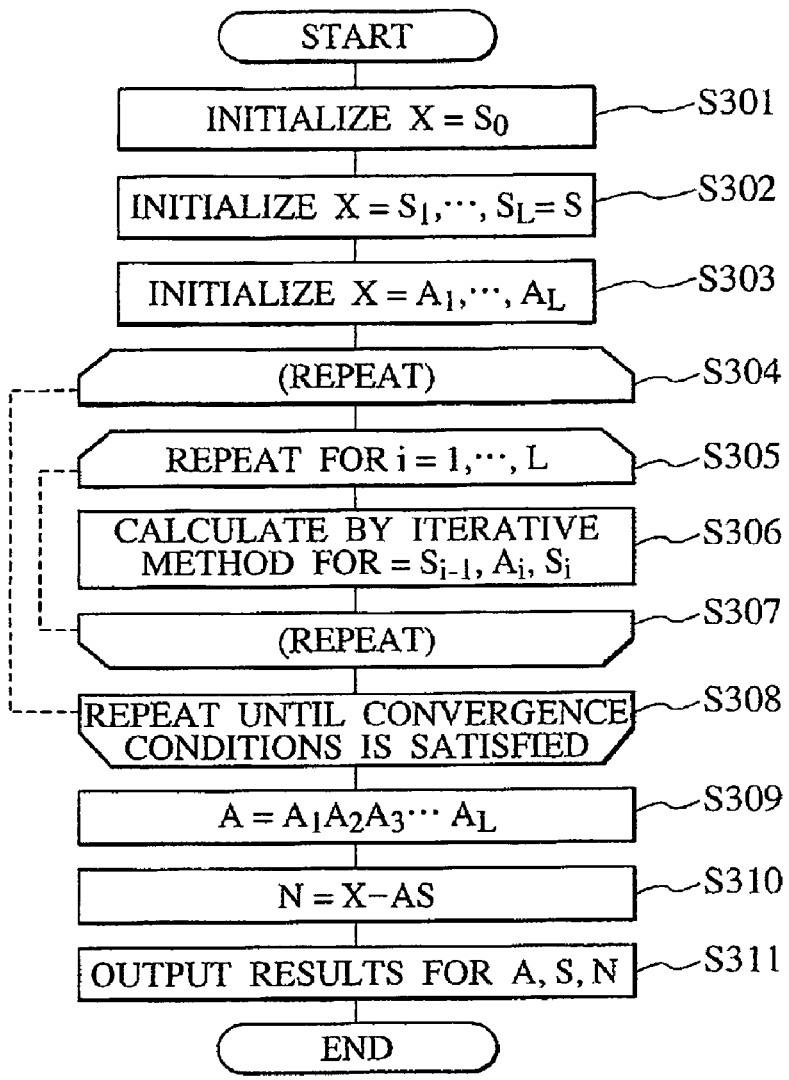
FIG. 3 is a flowchart illustrating the control flow of signal separating processing executed in the signal separating device.

FIG. 3 is a flowchart illustrating the control flow of the signal separating process executed in the signal separating device. The description hereinafter will refer to this diagram.

When processing commences in the signal separating device 100, the values of the observed signal that acts as the input are set in the matrix X (i.e., the matrix $S_0$) (step S301).

Next, the matrices $S_1, S_2, \ldots, S_{L-1}, S_L$ are initialized with suitable values (step S302). Herein, the matrix $S_L$ can be identified as the matrix S.

Furthermore, the matrices $A_1, A_2, \ldots, A_{L-1}, A_L$ are initialized with suitable values (step S303).

Various techniques in addition to initialization using the foregoing initial values may also be applied to the initialization of values in step S302 and step S303. In the present embodiment, these initialization processes are realized by cooperation between the CPU and the RAM or similar memory.

Next, the repetition controller 104 repeats the following processes of step S304 to step S308 (step S304) as long as the convergence condition is not satisfied (step S308). A variety of conditions similar to the iteration termination condition may be adopted as the convergence condition. Typically the convergence condition is considered to be satisfied when variation in the matrices $S_1, \ldots, S_L$ and the matrices $A_1, \ldots, A_L$ between respective repetitions has become exceedingly small.

Naturally, depending on the field of application, the convergence condition by which the terminus of the repetition is determined may also be set to always be true. In this case, the repetition is conducted only once, and in practice this simply reduces to serial processing.

Thus the repetition controller 104 is realized by the CPU cooperating with the RAM or similar memory.

During these repetitions, the processing of the following steps S305 to S307 are repeated. At the same time, the repeating calculator 102 increases a counter variable i by 1 per repetition from an initial value of 1 until the final value of L is reached (step S305).

Thus, the repeating calculator 102 is realized by the CPU working in conjunction with the RAM or similar memory.

More specifically, the i-th iterative estimator 101 provides the matrices $S_i$, $A_i$, and $S_i$ as input, and then causes the computational processing of the foregoing iterative method to be conducted (step S306).

As described in the foregoing, the computational processing of the iterative method in step S306 is repeated until an iteration termination condition is satisfied, but the selection of the iteration termination condition may be varied to suit a specific field or goal of application.

In addition, the i-th cost function $J_i$ and the iteration termination condition (i) provided to the i-th iterative estimator 101 may be identical for all values of i=1, ..., L, or they may be different.

The matrices $A_i$ and $S_i$ are the matrices whose values have become closer to the "actual values" via the iterative method in the processing in step S306. Moreover, as described above, the estimated results of the iterative estimator 101 for this iteration are stored in the storage regions $A_i$ and $S_i$.

In this way, by repeating the iterative estimations of the iterative estimators 101 for i=1, ..., L (step S307), values with a higher accuracy than the initial values set in the matrices $S_1, \ldots, S_L$ and the matrices $A_1, \ldots, A_L$ in steps S302 and S303 are stored in the same regions thereof.

By testing these values it is then determined whether or not the convergence condition has been satisfied. If the convergence condition has not been satisfied, the process returns to step S304 and continues to be repeated (step S308).

On the other hand, if the convergence condition has been satisfied, the result output unit 103 solves for the mixing matrix A by taking the matrix product (step S309)

$$A = A_1 A_2 \ldots A_{L-1} A_L$$

and additionally solves for the noise matrix N by performing matrix arithmetic (step S310)

$$N = X - AS$$

and outputs these results by storing the matrices A, S ($=S_L$), and N in the RAM or similar memory (step S311), thereby terminating the process. Thus, the CPU, working in conjunction with the RAM or similar memory, functions as the result output unit.

The iterations described above are equivalent to conducting signal separation in the following manner. In order to ease understanding, expressions relating to the noise matrix have been omitted from the following derivation.

$$X =$$
$$S_0 = A_1 S_1;$$
$$S_1 = A_2 S_2;$$
$$S_2 = A_3 S_3;$$
$$\ldots$$
$$S_{L-2} = A_{L-1} S_{L-1}$$
$$S_{L-1} = A_L S_L$$
$$= A_L S$$

To summarize, this can be expressed as the following:

$$X = A_1 A_2 A_3 \ldots A_L S$$
$$= AS$$

The matrix product in step S309 is equivalent to solving for the matrix A as shown above.

(Predefined Matrix Operation)

In the foregoing embodiment, the matrix product is used as the predefined matrix operation $c(\bullet, \bullet)$. More specifically, where an element of a matrix Z having i rows and t columns is written as Z[i, t], and the number of rows of the matrix Z is written as row(Z) and the number of columns of the matrix Z is written as col(Z), then for the matrices Z and W existing in a relationship such that col(Z)=row(W), the predefined operation is defined as:

$$c(Z, W)[i, t] = \sum_{k=1}^{col(Z)} Z[i, k] W[k, t]$$

In the case where a matrix convolution operation is considered as the operation $c(\bullet, \bullet)$, then a tensor operation taking into account two-dimensional matrices (i.e., second order tensors) and three-dimensional matrices (i.e., third order tensors) is to be conducted. The matrix subject to this convolution operation is referred to as the mixing operator.

While the observed signal matrix X and the source signal matrix S are two-dimensional matrices as described above, the mixing matrix A is a three-dimensional matrix. The elements of a three-dimensional matrix are expressed in the form $[\bullet, \bullet, \bullet]$ similar to the above. In addition, in accordance with conventional manner of tensor operation, the values of regions where elements are undefined are taken to be 0, and the subscript of $\Sigma$ indicates that a sum is to be taken over the entire indicated range of the indices in the tensor.

Then, a convolution of a third-order tensor A and a second-order tensor S is defined as shown in Equation 1.

$$c(A, S)[i, t] = \sum_{k} \sum_{s=-\infty}^{\infty} A[i, k, s] S[k, t-s] \qquad [\text{Eq. 1}]$$

On the other hand, a convolution of a third-order tensor A and a third-order tensor B is defined as shown in Equation 2.

$$c(A, B)[i, t, r] = \sum_{k} \sum_{s=-\infty}^{\infty} A[i, k, s] S[k, j, r-s] \qquad [\text{Eq. 2}]$$

In addition, in the case where a nonlinear link function is used, the operation may be defined as $$c(A, S)[i, t] = f\left(\sum_{k} Z[i, k] W[k, t]\right)$$

may be defined. For the function $f(\bullet)$, typically a step function that is smooth in the vicinity of the origin as that is often used in the field of neural networks may be used. For example, a function such as $$f(x) = 2 \arctan(kx)/\pi$$

where k is sufficiently large, may be used. Typically, however, it is possible to apply an arbitrary nonlinear function.

(Test Results)

Hereinafter, the results of a variety of tests comparing the foregoing embodiment with conventional techniques will be described. All of the following tests were conducted via computer simulation.

Test 1 involves comparing signal separations corresponding to sound waves emitted from a plurality of sound sources (more commonly, the propagation of a source signal emitted from a signal source) as collected by a microphone positioned nearby (more commonly, the observed signal obtained by observing the propagation with a receiver or a sensor). In the following, testing is conducted using benchmark data used in the field of signal separation obtained by NMF (non-negative matrix factorization).

Figure 4:
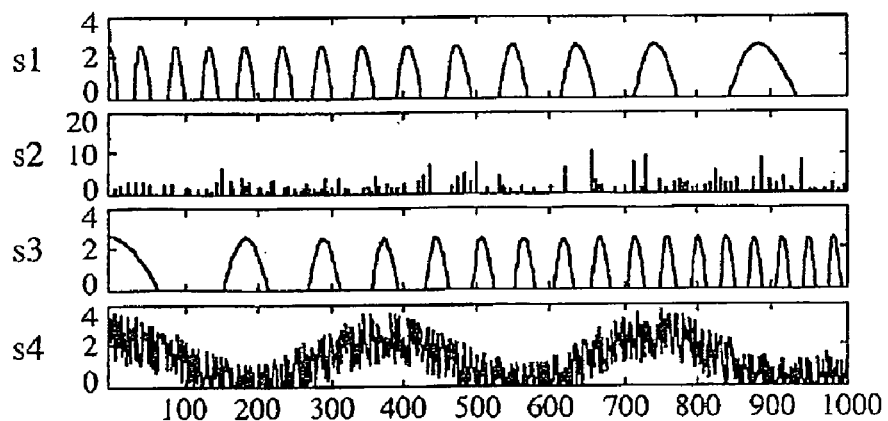
FIG. 4 is a graph illustrating the waveforms of the source signals in a first test.
Figure 5:
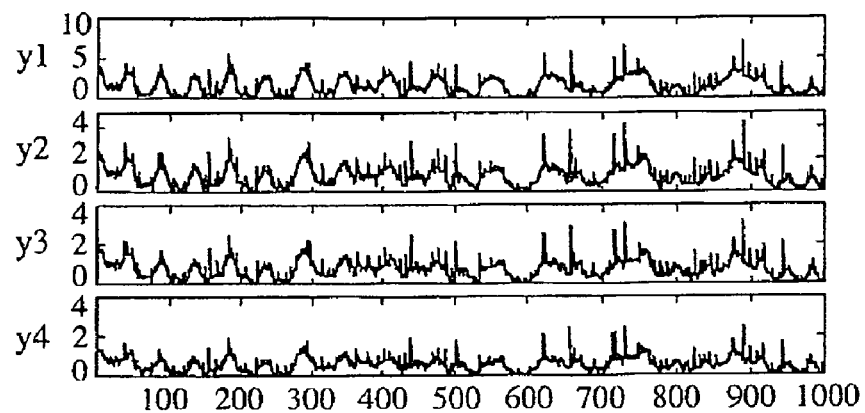
FIG. 5 is a graph illustrating the waveforms of the observed signal in the first test.

FIG. 4 is a graph showing the nature of the waveforms of the source signal. FIG. 5 is a graph showing the nature of the waveforms of the observed signal.

If the waveforms of the source signal in FIG. 4 are mixed using a Hilbert matrix with a condition-number of approximately 15000, then an observed signal can be obtained like that shown in FIG. 5, with mutually similar waveforms.

Figure 6:
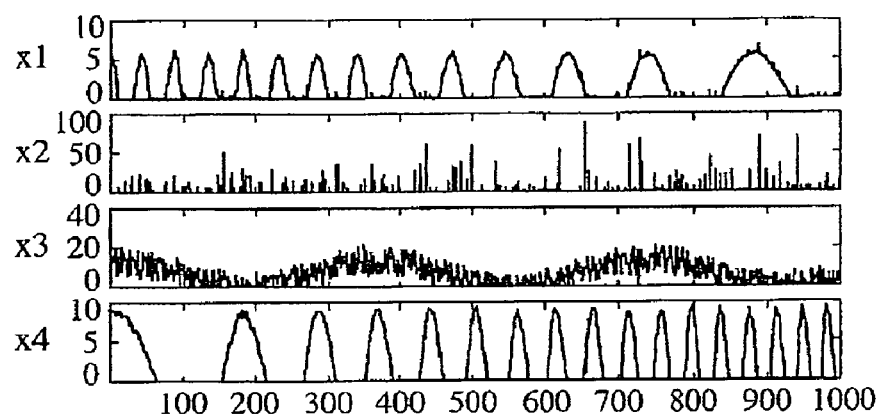
FIG. 6 is a graph of the waveforms in the first test, in the case where independent component analysis is conducted to yield four signals via the technique of the present embodiment, using the conjugate gradient method with L=10.
Figure 7:
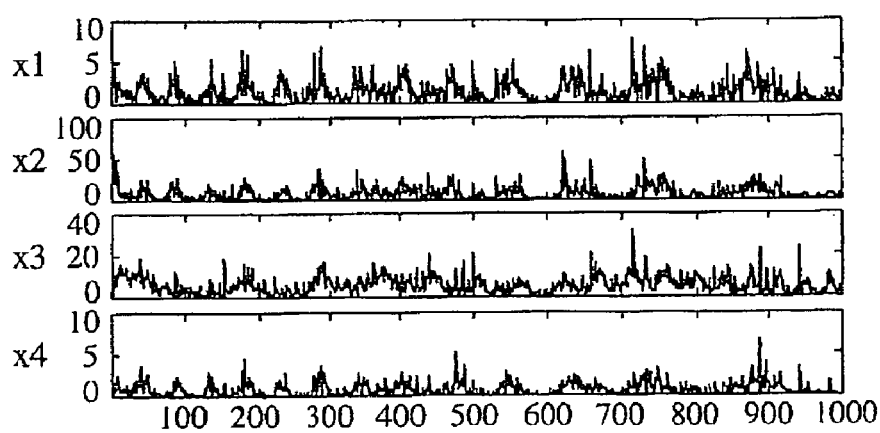
FIG. 7 is a graph of the waveforms in the first test, in the case where independent component analysis is conducted on the four signals via the conventional technique.

FIG. 6 is a graph of the waveforms in the case where independent component analysis is conducted on the four signals via the technique of the present embodiment, using the conjugate gradient method with L=10. By contrast, FIG. 7 is a graph of the waveforms in the case where independent component analysis is conducted on the four signals via the conventional technique.

In the conventional technique (FIG. 7), the signal is resolved into components that are entirely different from those of the original waveforms (FIG. 4). However, it is understood that by using the technique of the present embodiment (FIG. 6), a signal that is extremely close to the original waveforms is obtained (FIG. 4).

Test 2 illustrates signal separation in the case where a large amount of noise is present.

Figure 8:
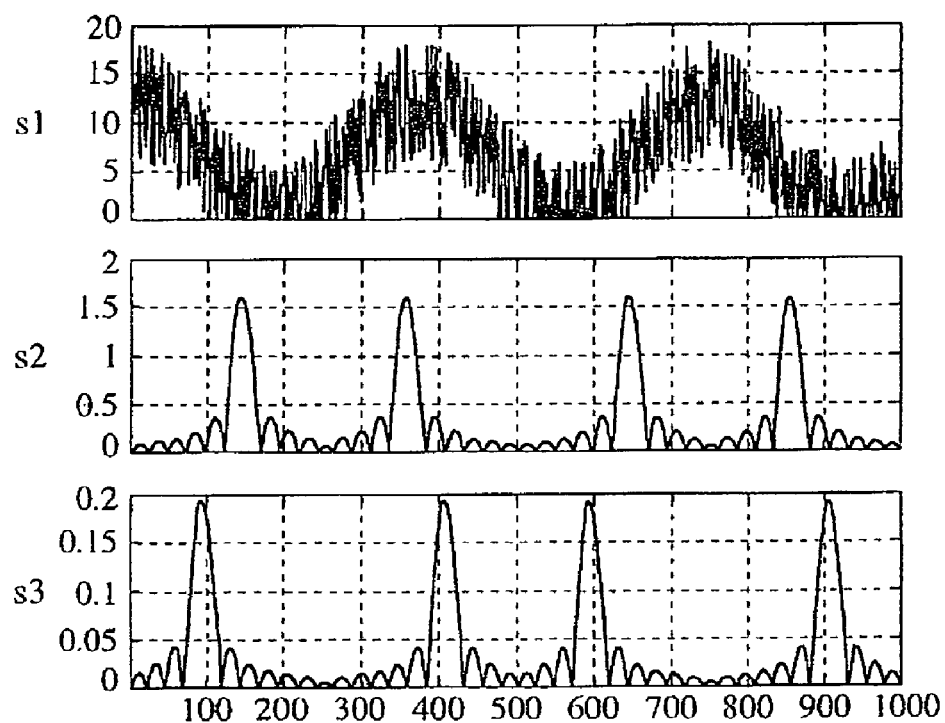
FIG. 8 is a graph illustrating the nature of the waveforms of the source signal in a second test.
Figure 9:
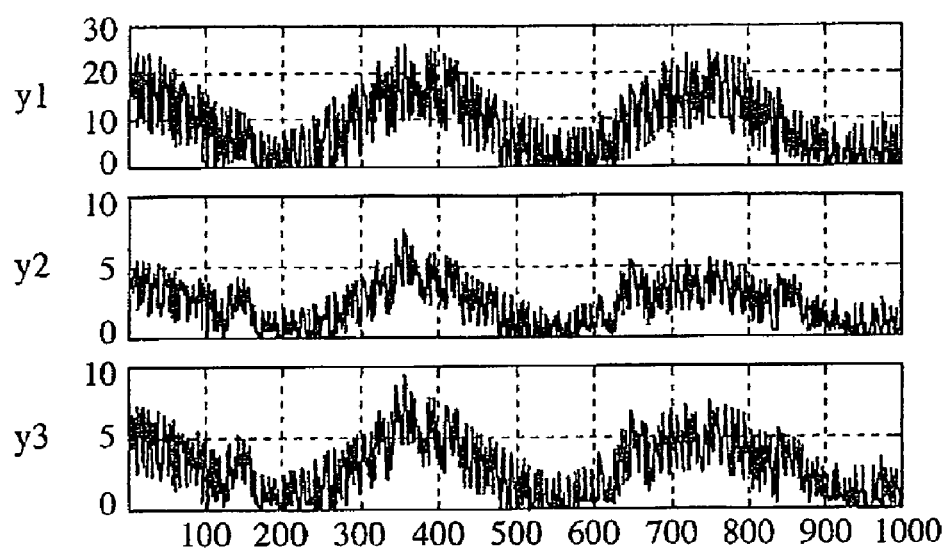
FIG. 9 is a graph illustrating the nature of the waveforms of the observed signal in the second test.

FIG. 8 is a graph showing the nature of the waveforms of the source signal. FIG. 9 is a graph showing the nature of the waveforms of the observed signal.

As shown in the upper part a1 of FIG. 8, the noise level is very high, and thus it can be seen that noise is also present in the observed signal, as shown in FIG. 9.

Figure 10:
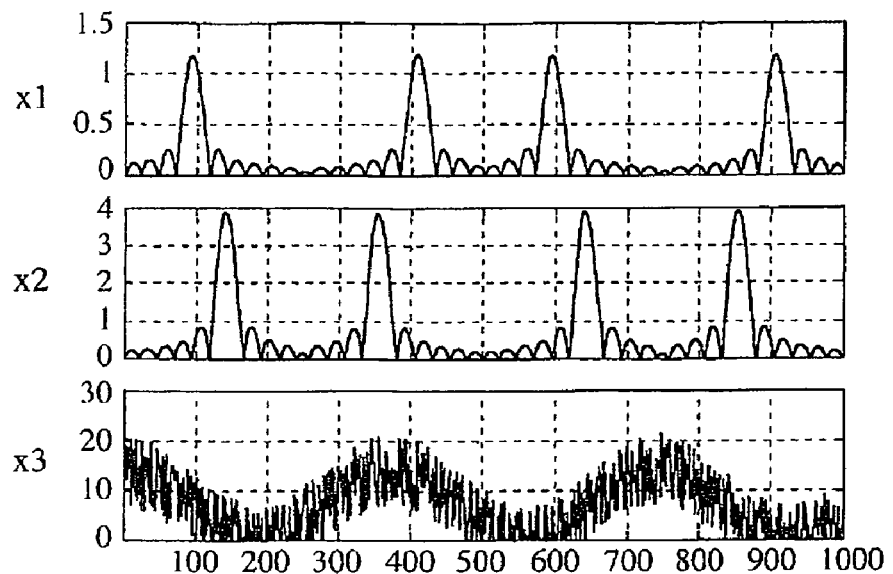
FIG. 10 is a graph of the waveforms obtained in the second test via the technique of the present embodiment, wherein the iterative estimator uses Amari's a-divergence NMF algorithm with L=5.
Figure 11:
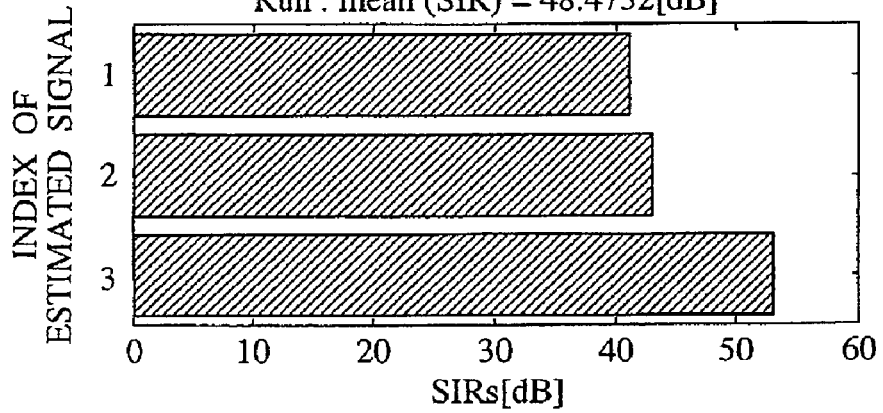
FIG. 11 is a graph illustrating the SIR (signal to interference ratio) values in the second test.

FIG. 10 is a graph of the waveforms obtained via the technique of the present embodiment, wherein the iterative estimators use Amari's α-divergence NMF algorithm with L=5. FIG. 11 is a graph showing SIR (Signal to Interference Ratio) values.

Compared to FIG. 8, it can be seen that an extremely similar signal is obtained, and additionally, quality is favorable with SIR values of approximately 40 dB to 53 dB.

Figure 12:
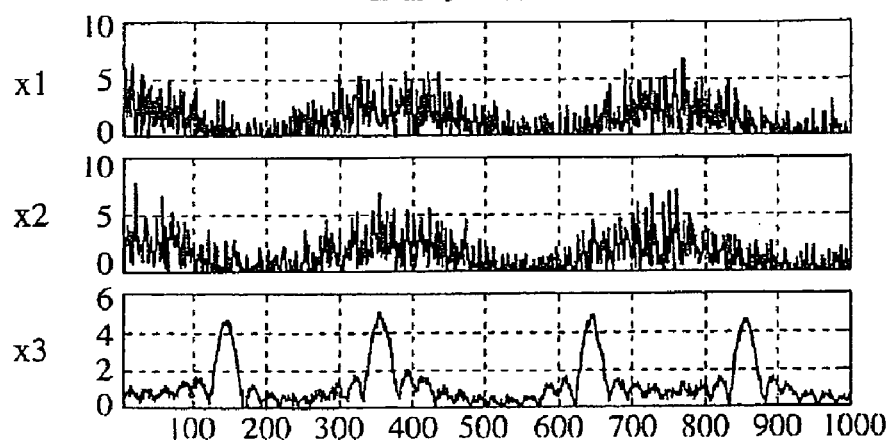
FIG. 12 illustrates the waveforms obtained in the second test using the conventional technique of the NMF Lee-Seung algorithm.

FIG. 12 shows the waveforms obtained using the conventional technique of the NMF Lee-Seung algorithm.

The conventional technique yields SIR values of less than 8 dB, and thus the high capability of the technique of the present embodiment is apparent.

Test 3 is an application to image processing.

Figure 13:
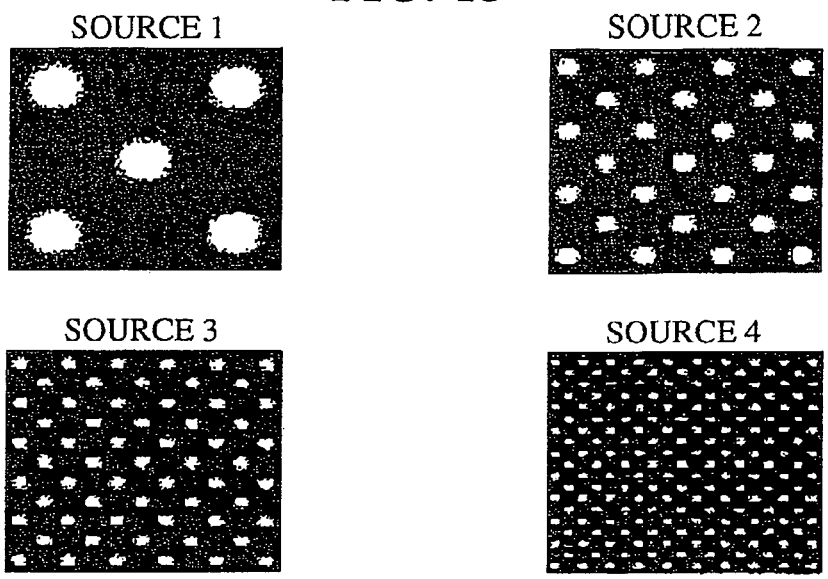
FIG. 13 is a diagram illustrating the images which act as the source signal in a third test.
Figure 14:
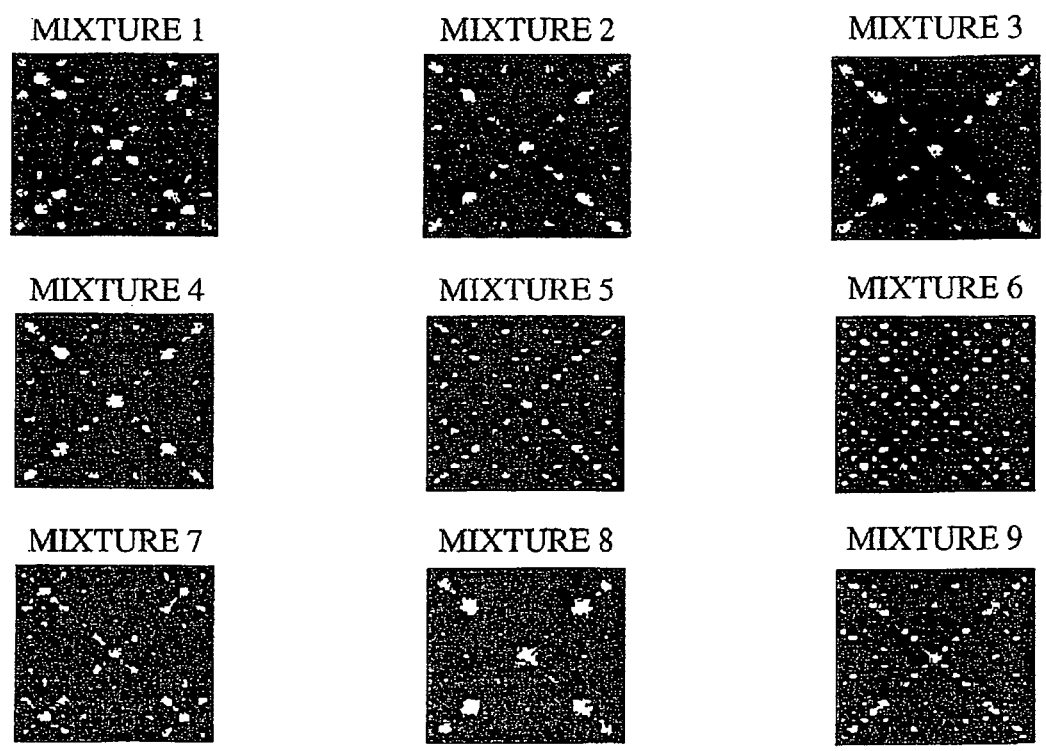
FIG. 14 is a diagram illustrating the images corresponding to the observed signal in the third test.
Figure 15:
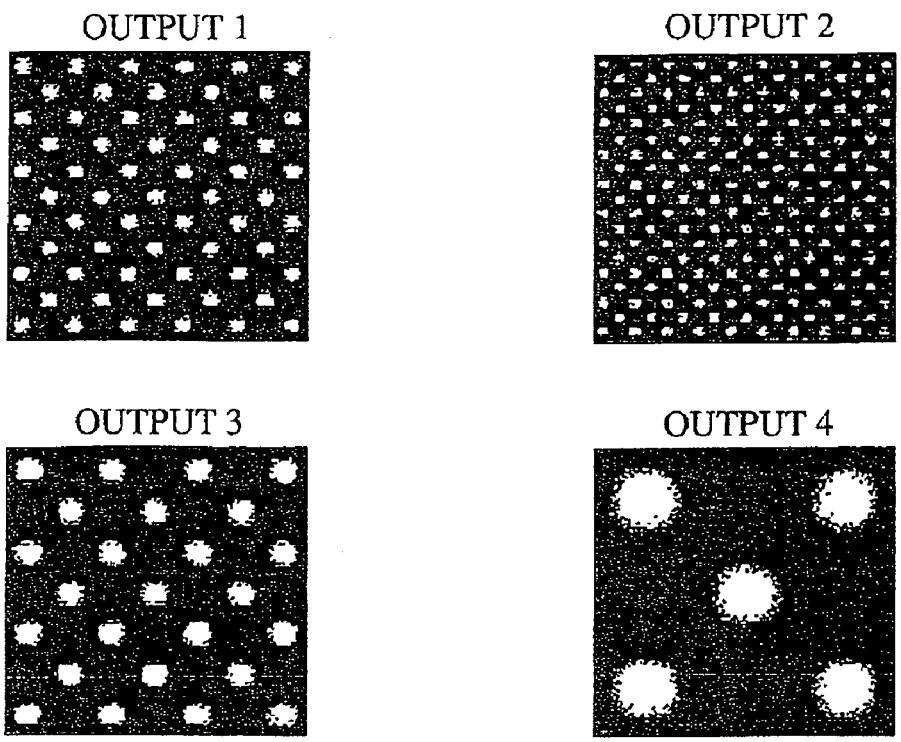
FIG. 15 is a diagram illustrating the nature of the source signal obtained in the third test, in the case where the technique of the present embodiment is adopted with L=5.
Figure 16:
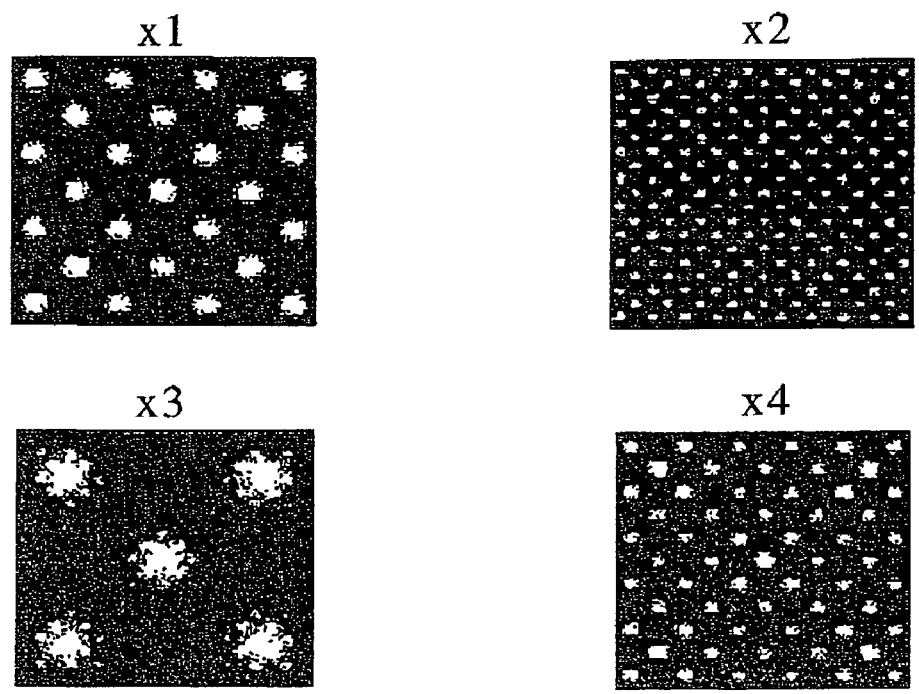
FIG. 16 is a diagram illustrating the nature of the source signal obtained in the third test, in the case where the technique of the present embodiment is adopted with L=2.
Figure 17:
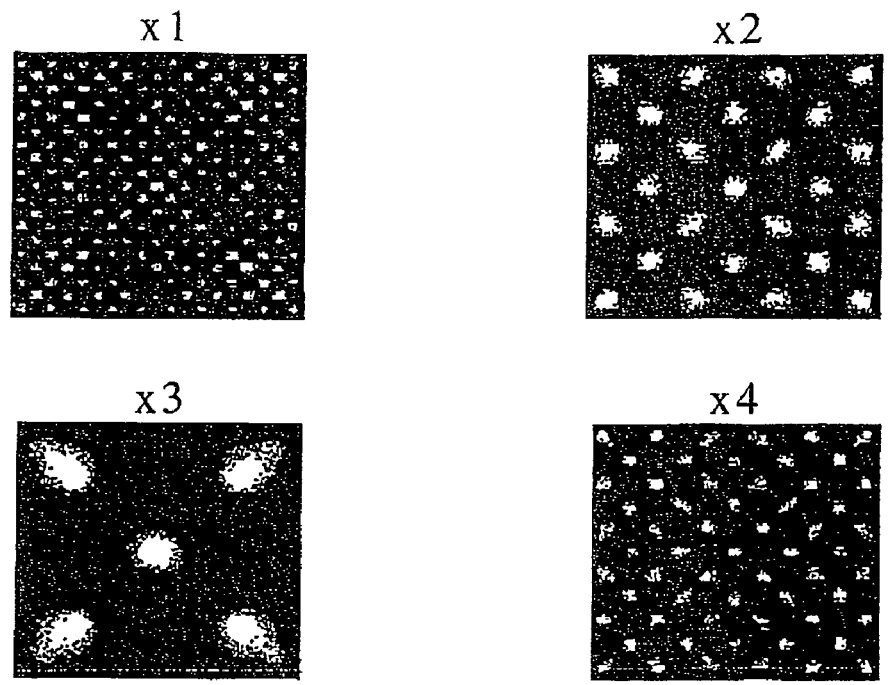
FIG. 17 is a diagram illustrating the source signal images obtained in the third test using the conventional technique of the NMF Lee-Seung algorithm.
Figure 18:
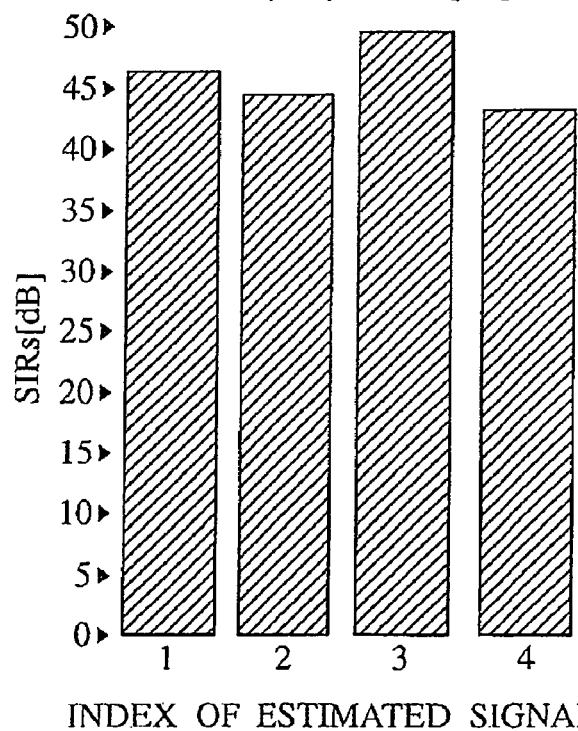
FIG. 18 is a graph illustrating the SIR values of the signal from the technique of the present embodiment in the third test.

FIG. 13 is a diagram showing the images which act as the source signal. FIG. 14 is a diagram showing the images corresponding to the observed signal. FIG. 15 shows the nature of the source signal obtained in the case where the technique of the present embodiment is adopted with L=5. FIG. 16 shows the nature of the source signal obtained in the case wherein the technique of the present embodiment is adopted with L=2. FIG. 17 shows the source signal images obtained using the conventional technique of the NMF Lee-Seung algorithm. FIG. 18 is a graph showing the SIR values of the signal from the technique of the present embodiment.

As shown in FIG. 13, there are four source signals, and as shown in FIG. 14, these are observed using nine channels.

Using independent component analysis via the technique of the present invention with L=5 restores the source signal nearly perfectly, as shown in FIG. 15. SIR values are approximately 46 dB, as shown in FIG. 18.

Meanwhile, using independent component analysis via the technique of the present invention with L=2 results in insufficient separation and low SIR values of less than 15 dB. The effect of increasing the value of L is thus clearly displayed.

The results of separation via the conventional technique are shown in FIG. 17. As expected, separation is insufficient, and the SIR values are less than 10 db.

Industrial Applicability

According to the present invention, it is possible to provide a signal separating device and a signal separating method, a computer-readable information recording medium storing a program that realizes the above on a computer or digital signal processor, and the program, which are suitable for improving precision as much as possible and speeding up convergence as much as possible in signal separating technology such as independent component analysis.

The invention claimed is:

1. A signal separating device that separates an observed signal matrix X having m rows and T columns into matrices A and S such that $$X = c(A, S) + N$$

is satisfied for a predefined matrix operation $c(\bullet, \bullet)$, wherein A is a mixing matrix having m rows and n columns, S is a source signal matrix having n rows and T columns, and N is a noise matrix having m rows and T columns, the signal separating device comprising:

an iterative estimator that operates with respect to a matrix function $J(\bullet, \bullet, \bullet)$ that takes a matrix having m rows and T columns, a matrix having m rows and n columns, and a matrix having n rows and T columns, and returns a scalar value, wherein, upon receiving a matrix having m rows and T columns, a matrix having m rows and n columns, and a matrix having n rows and T columns, the iterative estimator iteratively estimates, through a predetermined number of repetitions, a combination of arguments, which are a matrix having m rows and n columns, and a matrix having n rows and T columns, whereby the scalar value returned by the matrix function $J(\bullet, \bullet, \bullet)$ is extremized when the matrix having m rows and T columns is fixed;

a repeating calculator that calculates, by repetition, L number of matrices $A_1, A_2, A_3, \ldots, A_L$ such that $$c(A_1, c(A_2, c(A_3, c(\ldots, c(A_{L-1}, A_L)\ldots))))$$

yields a matrix of m rows and n columns, wherein the repeating calculator defines a matrix $$S_0 = X$$

wherein, during the i-th repetition (i=1, 2, 3, ..., L), the repeating calculator supplies to the iterative estimator a matrix $S_{i-1}$ having m rows and T columns, a predefined initial value matrix having m rows and n columns, and a predefined initial value matrix having n rows and T columns for a matrix function $J_i(\bullet, \bullet, \bullet)$ of the i-th repetition, thereby causing the iterative estimator to make iterative estimations with respect to the matrix function $J_i(\bullet, \bullet, \bullet)$ that takes a matrix having m rows and T columns, a matrix having m rows and n columns, and a matrix having n rows and T columns, and returns a scalar value, with the repeating calculator then taking the resulting matrix of m rows and n columns to be $A_i$, and also taking the matrix of n rows and T columns to be $S_i$; and a result output unit that calculates a mixing matrix A of m rows and n columns by evaluating $$A = c(A_1, c(A_2, c(A_3, c(\ldots, c(A_{L-1}, A_L)\ldots))))$$

using the calculated L number of matrices $A_1, A_2, A_3, \ldots, A_L$, takes the calculated matrix $S_L$ of n rows and T columns to be the source signal matrix S of n rows and T columns, and then outputs the matrices A and S.

2. The signal separating device according to claim 1, further comprising:

a repetition controller that causes the repeating calculator to re-calculate repetitions until the calculated L number of matrices $A_1, A_2, A_3, \ldots, A_L$ and the matrix $S_L$ of n rows and T columns satisfy a predetermined convergence condition, wherein the repetition controller causes the $A_i$ from the last repetition before the re-calculation and the $S_i$ from the last repetition before the re-calculation to be supplied as the predefined initial value matrix of m rows and n columns and the predefined initial value matrix of n rows and T columns for the i-th repetition;

wherein, if the predetermined convergence condition is met, then the result output unit calculates and then outputs the matrices A and S.

3. The signal separating device according to claim 1, wherein the result output unit additionally calculates a noise matrix of m rows and T columns according to $$N = X - c(A, S)$$

and additionally outputs this matrix N.

4. The signal separating device according to claim 1, wherein the predefined matrix operation $c(\bullet, \bullet)$ is defined as a matrix product operation.

5. The signal separating device according to claim 1, wherein the predefined matrix operation $c(\bullet, \bullet)$ is defined as a convolution operation.

6. The signal separating device according to claim 1, wherein the predefined matrix operation $c(\bullet, \bullet)$ is defined as a non-linear link function.

7. The signal separating device according to claim 1, wherein the number of iterations performed by the iterative estimator is set to one iteration per repetition for all i (i=1, 2, 3, . . . , L).

8. The signal separating device according to claim 1, wherein the i-th (i=1, 2, 3, . . . , L) matrix function $J_i(\bullet, \bullet, \bullet)$ used with respect to the iterative estimator is defined to be a same matrix function for all i.

9. A signal separating method executed by a signal separating device having an iterative estimator, a repeating calculator, and a result output unit that separates an observed signal matrix X having m rows and T columns into matrices A, S and N such that $$X=c(A,S)+N$$

is satisfied for a predefined matrix operation $c(\bullet, \bullet)$, wherein A is a mixing matrix having m rows and n columns, S is a source signal matrix having n rows and T columns, and N is a noise matrix having m rows and T columns, and wherein the signal separating method comprises:
 an iterative estimation step, wherein the iterative estimator operates with respect to a matrix function $J(\bullet, \bullet, \bullet)$ that takes a matrix having m rows and T columns, a matrix having m rows and n columns, and a matrix having n rows and T columns, and returns a scalar value, wherein, upon receiving a matrix having m rows and T columns, a matrix having m rows and n columns, and a matrix having n rows and T columns, the iterative estimator iteratively estimates, through a predetermined number of repetitions, a combination of arguments, which are a matrix having m rows and n columns, and a matrix having n rows and T columns, whereby the scalar value returned by the matrix function $J(\bullet, \bullet, \bullet)$ is extremized when the matrix having m rows and T columns is fixed;
 a repeating calculation step, wherein the repeating calculator calculates, by repetition, L number of matrices $A_1$, $A_2, A_3, \ldots, A_L$ such that $$c(A_1,c(A_2,c(A_3,c(\ldots,c(A_{L-1},A_L))\ldots))))$$

yields a matrix of m rows and n columns, wherein the repeating calculator defines a matrix $$S_0=X$$

wherein, during the i-th repetition (i=1, 2, 3, . . . , L), the repeating calculator supplies to the iterative estimator a matrix $S_{i-1}$ having m rows and T columns, a predefined initial value matrix having m rows and n columns, and a predefined initial value matrix having n rows and T columns for a matrix function $J_i(\bullet, \bullet, \bullet)$ of the i-th repetition, thereby causing the iterative estimator to make iterative estimations with respect to the matrix function $J_i(\bullet, \bullet, \bullet)$ that takes a matrix having m rows and T columns, a matrix having m rows and n columns, and a matrix having n rows and T columns, and returns a scalar value, with the repeating calculator then taking the resulting matrix of m rows and n columns to be $A_i$, and also taking the matrix of n rows and T columns to be $S_i$; and
 a result output step, wherein the result output unit calculates a mixing matrix A of m rows and n columns by evaluating $$A=c(A_1,c(A_2,c(A_3,c(\ldots,A_L)\ldots))))$$

using the calculated L number of matrices $A_1, A_2, A_3, A_L$, takes the calculated matrix $S_L$ of n rows and T columns to be the source signal matrix S of n rows and T columns, and then outputs the matrices A and S.

10. The signal separating method according to claim 9, wherein the signal separating device further includes a repetition controller, and the signal separating method further comprises:
 a repetition controlling step, wherein the repetition controller causes the repeating calculator to re-calculate repetitions until the calculated L number of matrices $A_1$, $A_2, A_3, \ldots, A_L$ and the matrix $S_L$ of n rows and T columns satisfy a predetermined convergence condition, wherein the repetition controller causes the $A_i$ from the last repetition before the re-calculation and the S, from the last repetition before the re-calculation to be supplied as the predefined initial value matrix of m rows and n columns and the predefined initial value matrix of n rows and T columns for the i-th repetition;
wherein, in the result output step, if the predetermined convergence condition is met, then the matrices A and S are calculated and output.

11. A non-transitory computer readable information recording medium storing a program that causes a computer to separate an observed signal matrix X having m rows and T columns into matrices A, S and N such that $$X=c(A,S)+N$$

is satisfied for a predefined matrix operation $c(\bullet, \bullet)$, wherein A is a mixing matrix having m rows and n columns, S is a source signal matrix having n rows and T columns, and N is a noise matrix having m rows and T columns, and wherein the program causes the computer to function as:
 an iterative estimator that operates with respect to a matrix function $J(\bullet, \bullet, \bullet)$ that takes a matrix having m rows and T columns, a matrix having m rows and n columns, and a matrix having n rows and T columns, and returns a scalar value, wherein, upon receiving a matrix having m rows and T columns, a matrix having m rows and n columns, and a matrix having n rows and T columns, the iterative estimator iteratively estimates, through a predetermined number of repetitions, a combination of arguments, which are a matrix having m rows and n columns, and a matrix having n rows and T columns, whereby the scalar value returned by the matrix function $J(\bullet, \bullet, \bullet)$ is extremized when the matrix having m rows and T columns is fixed;
 a repeating calculator that calculates, by repetition, L number of matrices $A_1, A_2, A_3, \ldots, A_L$ such that $$c(A_1,c(A_2,c(A_3,c(\ldots,c(A_{L-1},A_L))\ldots))))$$

yields a matrix of m rows and n columns, wherein the repeating calculator defines a matrix $$S_0=X$$

wherein, during the i-th repetition (i=1, 2, 3, . . . , L), the repeating calculator supplies to the iterative estimator a matrix $S_{i-1}$ having m rows and T columns, a predefined initial value matrix having m rows and n columns, and a predefined initial value matrix having n rows and T columns for a matrix function $J_i(\bullet, \bullet, \bullet)$ of the i-th repetition, thereby causing the iterative estimator to make iterative estimations with respect to the matrix function $J(\bullet, \bullet, \bullet)$ that takes a matrix having m rows and T columns, a matrix having m rows and n columns, and a matrix having n rows and T columns, and returns a scalar value, with the repeating calculator then taking the resulting matrix of m rows and n columns to be $A_i$, and also taking the matrix of n rows and T columns to be $S_i$; and a result output unit that calculates a mixing matrix A of m rows and n columns by evaluating $$A=c(A_1,c(A_2,c(A_3,c(\ldots,c(A_{L-1},A_L)\ldots))))$$

using the calculated L number of matrices $A_1, A_2, A_3, \ldots, A_L$, takes the calculated matrix $S_L$ of n rows and T columns to be the source signal matrix S of n rows and T columns, and then outputs the matrices A and S.

12. The non-transitory computer-readable information recording medium storing a program according to claim 11, further causing a computer to function as:

a repetition controller that causes the repeating calculator to re-calculate repetitions until the calculated L number of matrices $A_1, A_2, A_3, \ldots, A_L$ and the matrix $S_L$ of n rows and T columns satisfy a predetermined convergence condition, wherein the repetition controller causes the $A_i$ from the last repetition before the re-calculation and the $S_i$ from the last repetition before the re-calculation to be supplied as the predefined initial value matrix of m rows and n columns and the predefined initial value matrix of n rows and T columns for the i-th repetition;

wherein, if the predetermined convergence condition is met, then the result output unit calculates and then outputs the matrices A and S.

* * * * *